(12) United States Patent
Burton

(10) Patent No.: US 6,637,006 B1
(45) Date of Patent: *Oct. 21, 2003

(54) DIGITAL DATA DECODER WITH IMPROVED UNRELIABLE FRAME DETECTION PERFORMANCE

(75) Inventor: Mark Burton, Berkshire (GB)

(73) Assignee: NEC Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/521,450

(22) Filed: Mar. 7, 2000

(30) Foreign Application Priority Data

Mar. 13, 1999 (GB) .............................. 9905741

(51) Int. Cl.$^7$ .............................................. G06F 11/00
(52) U.S. Cl. ...................................... 714/798; 714/704
(58) Field of Search ............................... 714/705, 752, 714/755, 786, 798; 371/37.4, 37.01; 360/53; 395/2.42, 237; 375/224, 286, 227; 704/228

(56) References Cited

U.S. PATENT DOCUMENTS

| | | | |
|---|---|---|---|
| 4,870,645 A | * 9/1989 | Herron .......................... 360/53 |
| 5,557,639 A | * 9/1996 | Heikkila et al. ............. 375/224 |
| 5,596,678 A | * 1/1997 | Wigren et al. ............... 704/228 |
| 5,598,506 A | * 1/1997 | Wigren et al. ............... 704/228 |
| 5,666,370 A | * 9/1997 | Ganesan et al. ............. 375/286 |
| 5,850,405 A | 12/1998 | Wimmer et al. | |
| 6,092,230 A | * 7/2000 | Wood et al. .................. 714/755 |
| 6,397,358 B1 | * 5/2002 | Burton et al. ................ 714/705 |

FOREIGN PATENT DOCUMENTS

| | | |
|---|---|---|
| EP | 0 643 493 A1 | 3/1995 |
| EP | 0 648 032 A1 | 4/1995 |
| EP | 0 805 572 A2 | 11/1997 |
| GB | 2 312 359 | 10/1997 |
| WO | 97/14235 | 4/1997 |
| WO | 97/27686 | 7/1997 |

* cited by examiner

Primary Examiner—Albert Decady
Assistant Examiner—Mujtaba K. Chaudry
(74) Attorney, Agent, or Firm—Sughrue Mion, PLLC

(57) ABSTRACT

A received frame is provided to a first decoder and a first time reverse unit. The first decoder decodes the provided frame and outputs the decoded frame. The first time reverse unit reverses bits of the provided frame in time direction and outputs the time reversed frame. The time reversed frame is provided to a second decoder. The second decoder decodes the time reversed frame. This decoded frame is then provided to a second time reverse unit. The second time reverse unit reverses bits of the decoded frame in time direction and outputs the frame. The frame is outputted from the first decoder is compared with the frame is outputted from the second time reverse unit by comparator. If any difference exist between the two frames then the received frame is judged as unreliable.

6 Claims, 1 Drawing Sheet

DIGITAL DATA DECODER WITH IMPROVED UNRELIABLE FRAME DETECTION PERFORMANCE

BACKGROUND OF THE INVENTION

1. Field of the Invention

This invention relates to digital data transmission and in particular it relates to digital data decoders. The following description is based on the GSM cellular communications system for which the invention is of particular utility. It will be apparent to those skilled in the art, however that the invention may be applied to other systems of digital data transmission.

2. Description of the Related Art

Reference is made to U.S. Pat. Nos. 5,598,506 and 5,596,678 to Wigren et al., U.S. Pat. No. 5,557,639 to Heikkila and "Mobile Radio Communications" published by John Wiley & Sons, Raymond Steele (Ed.) for a description of the prior art and technological background. The following abbreviations are used therein:

GSM : Global System for Mobile communications, (formerly Group Special Mobile)

TCH/FS : Traffic channel full rate

TCH/HS : Traffic channel half rate

CRC : Cyclic redundancy check

PBER : Pseudo bit error rate

The GSM cellular communications system may use the Half Rate speech codec. The Half Rate speech codec encodes sixteen, 8 kHz samples into 112 bits containing 18 parameters. These 112 bits are divided into two groups based on their subjective importance to speech quality. The 17 least important bits are known as class II bits and are unprotected.

Corruption of these class II bits has minimal audible effect on speech quality. The most important 95 bits are known as class I bits and are protected by additional convolutional coding. The class I bits are further subdivided into Ia and Ib, such that the most significant 22 bits (Ia) are additionally protected by a 3 bit cyclic redundancy check (CRC). All of the class I bits and class Ia CRC check bits are protected by a ⅓ rate convolutional code of constraint length K=7, which is punctured to reduce the number of transmitted encoded bits by one third before transmission.

In order to prevent any audio artifacts after speech transmission and decoding, any frame erasure and concealment mechanism must detect all frames with any class Ia errors and frames with more than a certain number of class Ib errors, as precisely and efficiently as possible for all propagation channel types. For the GSM Full Rate and GSM Enhanced Full Rate speech codecs this is achieved by marking such frames as bad to the speech codecs using an algorithm referred to as the frame erasure algorithm.

In this respect the Half Rate Speech codec differs from the other GSM specified codecs because in addition to a mechanism for marking a received speech frame as bad, it requires are extra mechanism for marking a received frame as unreliable and utilises an algorithm known as the "unreliable frame erasure algorithm".

When a received speech frame is marked as bad the speech codec erases the frame and applies a concealment algorithm in order to mask the effects of the bad frame from the user. When a received speech frame is marked as unreliable the speech codec performs its own validation check on the speech frame. If the validation check fails then the speech codec erases the failing speech frame. If the validation check passes then the speech frame is considered to be good and is used by the codec. This internal test performed by the speech codec is based on exploiting known properties of human speech, namely that the energy in speech varies slowly and thus it is unlikely that abrupt changes will be experienced.

The internal test is implemented by calculating the difference of an energy metric between the last good received speech frame and the current unreliable frame. If this energy difference is greater than some predetermined threshold then the frame is deemed bad and erased.

Thus it is apparent that two different algorithms are required by the Half Rate speech codec, one for detecting bad frames and the other for detecting unreliable frames. The conventional bad frame detection algorithm is composed of a 3 bit CRC check and a PBER threshold test.

The CRC check is made on the received speech frame by recalculating the CRC for the 22 class Ia bits and comparing this value to the received value. If they are different the CRC check is deemed to have failed. The PBER is calculated by re-encoding and puncturing the decoded received class I bits, comparing them bit by bit with the original received class I bits and counting the number of differences. If the specified PBER ($P_{bad}$) threshold has been exceeded then the PBER threshold test is deemed to have failed. If either of these two tests fail then the received speech frame is marked as bad.

The conventional unreliable frame detection algorithm also makes use of a PBER threshold test for which the PBER is calculated in the manner described above, except that the threshold $P_{unrel}$ is less than $P_{bad}$. Frames which have a calculated PBER higher than $P_{bad}$ are marked as bad. Frames with a PBER greater than $P_{unrel}$ but lower than $P_{bad}$ are marked as unreliable. Frames with a PBER less than $P_{unrel}$ are by definition good frames. A frame marked as bad is automatically considered unreliable whereas an unreliable frame is not necessarily bad.

The method of judging unreliable frames described above does not work as efficiently as is possible because the method is based on the assumption that the calculated PBER is highly correlated with the true number of bits in error. This assumption does not hold when convolutional decoding breakdown begins to occur and unreliable frames are not marked as such.

SUMMARY OF THE INVENTION

An object of the present invention is to improve unreliable frame detection performance for speech channels such as the Half Rate GSM speech channel, to provide better audio performance.

According to the invention a frame which is decoded by a first decoder is compared with a frame of which bits are reversed in a reversed direction by a first time reverse unit and decoded by a second decoder and bits are reversed in a time reversed direction by a second time reverse unit. If any difference exist between the two frames then received frame is judged as unreliable.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 1:
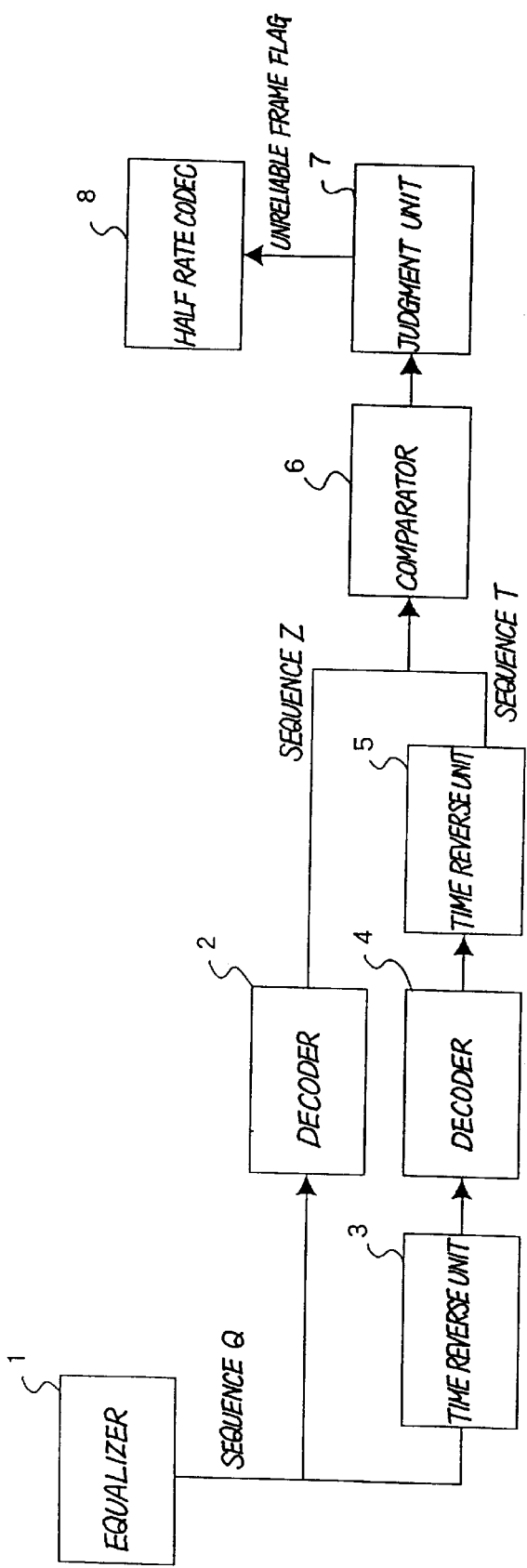
FIG. 1 is a block diagram of a digital data decoder according to the present invention.

One example of the invention will now be described with reference to the FIG. 1.

As shown FIG. 1, a digital data decoder according to the prevent invention comprises an equalizer 1 for equalizing, de-interleaving and de-puncturing received frame and outputting the frame, a first decoder 2 for decoding the frame outputted from the equalizer 1 and outputting the decoded frame, a first time reverse unit 3 for reversing bits of the frame outputted from the equalizer 1 in a time reversed direction and outputting the time reversed frame, a second decoder 4 for decoding the frame outputted from the time reverse unit 3 and outputting the decoded frame, a second time reverse unit 5 for reversing bits of the frame outputted frame the decoder 4 in a time reversed direction and outputting the time reversed frame, a comparator 6 for comparing the frame outputted from the decoder 2 with the frame outputted from the time reverse unit 5 and outputting the result of the comparison, a judgment unit 7 for judging the received frame as either reliable or unreliable in accordance with the result of the comparison outputted from the comparator 6, and a half rate codec 8 for receiving an unreliable frame flag from the judgment unit 7.

The algorithm of a digital data decoder having the construction described as the above is designed to detect breakdown in the convolutional decoding process and thereby to determine whether or not the data protected by the convolutional code may be considered reliable. This breakdown condition of convolutional decoding is characterised by a burst of essentially random errors being produced until the decoding process re-synchronises.

In this example a TCH/HS GSM channel is described, however, more generally is presented a method for identifying an unreliable frame in a digital data transmission system.

After equalisation, de-interleaving, de-puncturing and convolutional decoding of the n encoded received bits (including 95 class I bits, 3 CRC bits, 6 tail bits), using a truce back length of x less than or equal to n, to produce a first sequence of an decoded bits; convolutionally decoding a copy of the n encoded received bits in a time reversed direction using a trace back length of y, where y is less than or equal to n, to produce n time reversed decoded bits; time reversing again the n time reversed bits, deleting the bit offset R (R=k-1, k=constraint length=7) caused by the reverse decoding process to produce a second sequence, comparing the first n-R bits of the first sequence with the first n-R bits of the second sequence and judging the received frame as either reliable or unreliable in accordance with the result of the comparison.

A frame is marked as unreliable when a number of differences greater than zero is calculated in the comparison between the first sequence and the second sequence.

The instant unreliable frame detection mechanism is implemented after the usual equalisation and de-interleaving stages of a GSM radio receiver as follows.

The frame which is equalized, de-interleaved and de-punctured is outputted from the equalizer 1 as a sequence Q of encoded symbols derived from a received frame. Forward convolutional decoding at the decoder 2 of the 211 coded symbols are outputted from the equalizer 1 is effected using a trace back length of x symbols (x less than 105, typically 31), to produce a sequence Z consisted of 95 decoded class I bits, 6 tail bits and 3 CRC bits. A copy of the 211 coded symbols are outputted from the equalizer 1 which is reversed bits in a time reversed direction by the time reverse unit 3. The time reversed sequence direction convolutionally decoded at the decoder 4, using a trace back length of y symbols (y less than 105, typically 15), to produce 95 decoded class I bits, 6 tails bits and 3 CRC bits which are time reversed.

The time reversed set of bits is again time reversed in the time reverse unit 5, thereby reverting to the original time ordering and becomes sequence T. The first 6 bits of sequence T are deleted and sequence T is compared bit by bit with sequence Z for the first 99 bits and the number of differences between sequence T and sequence Z computed in the comparator 6. Where differences are found between sequence Z and sequence T, the received frame is marked as unreliable in the judgment unit 7. If no differences are found in the comparison of the two sequences T and Z then the frame is marked as reliable in the judgment unit 7.

Time reversed decoding of any linear convolutional code, where the start and finish states are known, may be achieved by reversing the order of the generator polynomials and also reversing the order in which the bits contribute to the produced symbol. As an example consider the n=3, K=7 coding used by a GSM TCH/HS channel. The characteristic polynomials are defined as;

$G_0 = 1+D^2+D^3+D^5+D^6$ (1011011)
$G_1 = 1+D+D^4+D^6$ (1100101)
$G_2 = 1+D+D^2+D^3+D^4+D^6$ (1111101)

The time reversed version is then given by:

$T_0 = 1+D^2+D^3+D^4+D^5+D^6$ (1011111)
$T_1 = 1+D^2+D^5+D^6$ (1010011)
$T_2 = 1+D+D^3+D^4+D^6$ (1101101)

Using the modified coding scheme, decoding may then be performed in the time reversed direction, however, allowance must be made for a K−1 bit alignment error which is incurred from this time reversed decoding procedure.

Account must be taken of the 6 bit offset introduced into the time reversed bits due to the time reversed decoding procedure by deleting these first 6 bits output from the time reverse unit 5, the backward decode, thereby producing sequence T. The first 99 bits of sequence Z are compared to the first 99 bits of sequence T in the comparator 6 and the number of differences calculated. If no differences exist then the received frame is marked as reliable, otherwise the frame is marked as unreliable in the judgment unit 7 and passed to the Half rate codec 8.

Values of track back length x and y and may be chosen empirically such that the best performance of this algorithm is achieved for the desired channel propagation conditions.

Although a certain preferred embodiment of the present invention has been shown and described and modifications may be made therein without departing from the scope of the appended claims.

What is claimed is:

1. A digital data decoder comprising:
   an equalizer for equalizing, de-interleaving and de-puncturing a received frame and outputting the frame;
   a first decoder for decoding the frame outputted from said equalizer and outputting the decoded frame;
   a first time reverse unit for reversing bits of the frame outputted from said equalizer in a time reversed direction and outputting the time reversed frame;
   a second decoder for decoding the frame outputted from said first time reverse unit and outputting the decoded frame;

a second time reverse unit for reversing bits of the frame outputted from said second decoder in a time reversed direction and outputting the time reversed frame;

a comparator for comparing the frame outputted from said first decoder with the frame outputted from said second time reverse unit and outputting the result of the comparison; and a judgment unit for judging the received frame as either reliable or unreliable in accordance with the result of the comparison outputted from said comparator.

2. A digital data decoder according to claim 1, wherein said comparator calculates the number of differences between the frame outputted from said first decoder and the frame outputted from said second time reverse unit, and said judgment unit judges the received frame as an unreliable frame if any difference exists between the frame outputted from said first decoder and frame outputted from said second time reverse unit.

3. A digital data decoder according to claim 2, wherein said judgment unit judges the received frame as a reliable frame if no difference exists between the frame outputted from said first decoder and the frame outputted from said second time reverse unit.

4. A digital data decoder comprising:

an equalizer for equalizing, de-interleaving and de-puncturing a received frame and outputting the frame as strings of n bits;

a first decoder for decoding the strings outputted from said equalizer and outputting the decoded strings as a first sequence;

a first time reverse unit for reversing bits of the strings outputted from said equalizer in a time reversed direction and outputting the time reversed strings;

a second decoder for decoding the strings outputted from said first time reverse unit and outputting the decoded strings;

a second time reverse unit for reversing bits of the strings outputted from said second decoder in a time reversed direction and deleting offset bits caused by the reversing process and the decoding process from the time reversed strings and outputting the strings as a second sequence;

a comparator for comparing said first sequence with said second sequence and outputting the result of the comparison; and a judgment unit for judging the received frame as either reliable or unreliable in accordance with the result of the comparison outputted from said comparator.

5. A digital data decoder according to claim 4, wherein said comparator calculates the number of differences between said first sequence and said second sequence, and said judgment unit judges the received frame as an unreliable frame if any difference exist between said first sequence and said second sequence.

6. A digital data decoder according to claim 5, wherein said judgment unit judges the received frame as a reliable frame if no difference exist between said first sequence and said second sequence.

* * * * *

UNITED STATES PATENT AND TRADEMARK OFFICE
CERTIFICATE OF CORRECTION

PATENT NO. : 6,637,006 B1
DATED : October 21, 2003
INVENTOR(S) : Mark Burton

It is certified that error appears in the above-identified patent and that said Letters Patent is hereby corrected as shown below:

<u>Title page,</u>
Item [30], Foreign Application Priority Data, change "Mar. 13, 1999 (GB)…………. 9905741" to -- Mar. 13, 1999 (GB) …………… 9905741 --.

Signed and Sealed this

Twenty-first Day of June, 2005

JON W. DUDAS
*Director of the United States Patent and Trademark Office*